United States Patent [19]
Tomita et al.

[11] Patent Number: 5,878,286
[45] Date of Patent: Mar. 2, 1999

[54] MOTION DETECTION DEVICE FOR A PHOTOGRAPHIC APPARATUS

[75] Inventors: Hiroyuki Tomita, Kawasaki; Hideki Yamaguchi, Mishima, both of Japan

[73] Assignee: Nikon Corporation, Tokyo, Japan

[21] Appl. No.: 926,472

[22] Filed: Sep. 10, 1997

[30] Foreign Application Priority Data

Sep. 10, 1996 [JP] Japan ................................. 8-238911

[51] Int. Cl.$^6$ .................................................. G03B 17/00
[52] U.S. Cl. ................................................................ 396/53
[58] Field of Search ....................... 396/53, 55; 359/554; 348/208

[56] References Cited

U.S. PATENT DOCUMENTS

| | | | |
|---|---|---|---|
| 5,041,852 | 8/1991 | Misawa et al. | 354/76 |
| 5,740,471 | 4/1998 | Terui | 396/53 |

FOREIGN PATENT DOCUMENTS

| | | |
|---|---|---|
| 4-76525 | 3/1992 | Japan . |
| 4-211230 | 8/1992 | Japan . |

*Primary Examiner*—W. B. Perkey

[57] ABSTRACT

A motion detection device for a motion compensation system, suitable for use in a camera, to precisely and quickly compute an omega zero as a reference value for motion compensation, and to perform highly accurate camera motion compensation by using an angular displacement signal which has been accurately calculated with an omega zero as a reference. A mean computation device computes an integration mean value which is a central value of the angular velocity signal based on a signal output from an angular velocity sensor. A setting device sets an omega zero initial estimate value to compute the omega zero reference value. An omega zero computation device computes the omega zero value based on the integration mean value and the omega zero initial estimate value. An integration device converts the omega zero to an angular displacement signal. The integration average value and the omega zero initial estimate value are assigned weights by a reducing function that decreases as time progresses after the beginning of the computation function. A greater weight is placed on the omega zero initial estimate value immediately after the beginning of the computation function, while a greater weight is placed on the integration mean value as time passes after the beginning of the computation function.

20 Claims, 7 Drawing Sheets

MOTION DETECTION DEVICE FOR A PHOTOGRAPHIC APPARATUS

CROSS-REFERENCE TO RELATED APPLICATIONS

This application is based upon and claims priority of Japanese Patent Application No. 08-238911 filed Sep. 10, 1996, the contents of which are incorporated herein by reference.

BACKGROUND OF THE INVENTION

1. Field of the Invention

The present invention relates to a motion detection device for use in a photographic device, such as a camera, to detect motion, such as vibration or shake caused by hand tremor. More particularly, the present invention relates to a motion detection device, suitable for use in a camera motion compensation system, which includes a motion sensor to detect motion and which accurately determines an integration constant as a reference value for control when an integration device performs time integration of the output of the motion sensor.

2. Description of the Related Art

Camera shake detection devices to detect camera shake are known. For example, photographic devices, such as a still camera, having a camera shake detection device have been proposed. In the conventional type of camera, the camera shake detected by the camera shake detection device is used to compensate for image blur caused by the camera shake. Specifically, the camera shake detection device outputs a detection signal which is used to control movement of a camera shake compensation lens, which is a part of a photographic lens, in a direction almost perpendicular to the optical axis, thereby compensating for image blur caused by the vibration of the camera at the time of a photographic operation.

A camera having an anti-vibration optical system for performing a conventional shake compensation operation is disclosed in Japanese Laid-Open Patent Publication No. H4-76525. The camera disclosed in Japanese Laid-Open Patent Publication No. H4-76525 consists of a camera shake compensation lens which is moveable in a plane perpendicular to the optical axis; a frame member to hold the camera shake compensation lens; a plate member to hold the frame member; four wires attached to the plate member; a main body to support the four wires; an actuator consisting of a winding coil, a yoke, and a permanent magnet to drive the camera shake compensation lens both vertically and horizontally; a light emitting element; a photosensor; and a position detection device to detect the position of the camera shake compensation lens.

The operation of the conventional camera shake compensation device will be described below with reference to FIG. 5, which is a block diagram of the conventional camera shake compensation device. As shown in FIG. 5, angular velocity sensor 10 detects camera shake. The angular velocity sensor 10 is, for example, a piezoelectric vibration type angular velocity sensor to detect the colioli force and to monitor the vibration of the camera. The output of the angular velocity sensor 10 is input to an integration section 40 to perform time integration of the output of the angular velocity sensor 10. The time integrated output of the angular velocity sensor 10 is converted into a shake angle of the camera, and then the integration section 40 converts the shake angle into target drive position information which is input to a servo circuit 100. A position detection device 120 monitors the movement of the camera shake compensation lens and feeds position information back to the servo circuit 100. The servo circuit 100 then calculates a difference between the target drive position information and the position information of the camera shake compensation lens, and transmits difference signals to an actuator 110 to drive the camera shake compensation lens according to the target drive position information. The actuator 110 drives the camera shake compensation lens within a plane that is almost perpendicular to the optical axis.

Conventional camera shake compensation devices require an integration constant which serves as a reference value for control when the integration section 40 performs time integration of the output of the angular velocity sensor 10. A method of calculating the integration constant is disclosed in, for example, FIGS. 17 and 18 of Japanese Laid-Open Patent Publication No. H4-211230.

A camera shake sensor of the camera shake compensation device disclosed in Japanese Laid-Open Patent Publication No. H4-211230 includes an angular velocity sensor to detect the colioli force; a drift element detection section, consisting of a central processing unit (CPU) and a memory, to calculate a mean value of the output of the angular velocity sensor which is sampled from a present time up to a designated time; and a subtractor to eliminate drift elements by subtracting the mean value from the output of the angular velocity sensor and to output the subtraction value thereof.

According to Japanese Laid-Open Patent Publication No. H4-211230, the output from the angular velocity sensor is entered to the drift element detection section every 10 milliseconds (ms), and fifty (50) outputs are entered every 0.5 seconds (10 ms×50). A calculated mean value for the fifty (50) outputs (hereinafter referred to as "mean 1") is stored in the memory of the drift element detection section. The "mean 1" is calculated twenty (20) times for 1000 outputs of the angular velocity sensor and entered in the memory of the drift element detection section after ten (10) seconds (0.5 seconds×20) have elapsed. Consequently, after ten (10) seconds from the start, the mean value for 1000 outputs (50×20) of the angular velocity sensor can be calculated.

In operation of the above-described conventional camera shake compensation device, it is necessary to determine the integration constant when integrating the output signal from the angular velocity sensor since the output signals from the angular velocity sensor are first integrated, and then converted into angular displacement information to be processed. Generally, the output from the angular velocity sensor when the camera is static (hereinafter referred to as "omega zero") is used as the integration constant.

However, photographic devices, such as a camera, normally vibrate due to the shaking of a photographer's hands when taking a photograph while manually holding the photographic device. Under these conditions, it is impossible to directly measure the output of the angular velocity sensor when the angular velocity sensor is static. Therefore, it is necessary to compute the omega zero based on the output signals of the angular velocity sensor with added vibration caused by the shaking of hands.

FIGS. 6A and 6B are graphs illustrating angular velocity and angular displacement, respectively, when omega zero has been accurately computed with a conventional camera shake compensation device. FIGS. 7A and 7B are graphs of angular velocity and angular displacement, respectively, when omega zero has been inaccurately computed with a conventional camera shake compensation device. More particularly, FIGS. 6A and 7A illustrate the angular velocity signal output from the angular velocity sensor. FIGS. 6B and 7B illustrate the angular displacement signal obtained from the angular velocity signal. In order to simplify the explanation below, it is assumed that the camera shake is entered as a sine wave and the omega zero is zero (0).

As shown in FIG. 6A, the center of the amplitude of the angular velocity signal is zero, and it is assumed that the value of omega zero is correctly attained at zero. Providing that the integration constant is the omega zero shown in FIG. 6A, an integration computation for the angular velocity attains the angular displacement signal shown in FIG. 6B. The angular displacement signal is accurately calculated when the angular velocity signal is integrated by applying the accurately obtained omega zero as an integration constant. Therefore, camera shake compensation can be achieved with a high degree of precision when the camera shake compensation lens is controlled using an angular displacement signal that has been accurately calculated.

On the other hand, as shown in FIG. 7A, the center of the amplitude of the angular velocity signal is not zero. As a result, the value of the calculated omega zero is not correctly attained at zero, and, instead, an offset value is applied. By performing the integration computation with the use of an incorrect omega zero value as an integration constant, an angular displacement signal with an added linear gradient is obtained, as shown in FIG. 7B. Therefore, if an incorrect omega zero value is used as an integration constant, the angular displacement signals cannot be accurately calculated. If the camera shake compensation lens is controlled with such an inaccurately calculated angular displacement signal, the camera shake compensation lens drifts while vibrating and camera shake compensation cannot be executed with a high degree of precision, thereby possibly worsening the image blur. Thus, precisely computing omega zero is an essential factor in performing shake compensation.

As discussed above, FIGS. 17 and 18 of Japanese Laid-Open Patent Publication No. H4-211230 disclose a method of computing the omega zero known as the movement average method. However, the movement average method disclosed in Japanese Laid-Open Patent Publication No. H4-211230 requires some time to accumulate the data to calculate the average. For example, when using the movement average computation method disclosed in Japanese Laid-Open Patent Publication No. H4-211230, omega zero is computed by calculating the mean 1 twenty (20) times for fifty (50) data inputs obtained every ten (10) ms. Thus, it takes ten (10) seconds (10 ms×50×20) from the beginning of computation to the output of omega zero. As a result, omega zero cannot be output by the conventional camera shake detection device for the first ten (10) seconds after activating the camera shake detection device.

For example, if the conventional camera shake detection device begins the computation of omega zero as a half-push switch (i.e., a photographic operation ready switch) of a camera is switched on by a photographer, camera shake compensation cannot be executed for the first ten (10) seconds after the computation has begun. As a result, a problem occurs in that a shutter opportunity could be missed during the time required to calculate omega zero, before camera shake compensation becomes possible.

Furthermore, if the number of samplings for the computation of the mean is decreased in order to expedite the output of omega zero, another problem occurs in that omega zero cannot be accurately detected, thereby reducing the effectiveness of the camera shake compensation or worsening the image blur.

SUMMARY OF THE INVENTION

It is an object of the present invention to provide a motion detection device, suitable for use in a camera, to precisely and quickly compute an omega zero as a reference value, and to compensate for camera motion with a high degree of precision by using an angular displacement signal that has been accurately calculated with omega zero as a reference.

Objects and advantages of the present invention are attained in accordance with embodiments of the present invention with a motion detection device, suitable for use in a camera, including a motion detector to detect motion and to output a motion detection information, a computation device to determine a central value based on the motion detection information, and to determine a reference value to control motion compensation based on the motion detection information, and a setting device to set a default value for calculating the reference value, wherein the computation device determines the reference value based on the central value and the default value. The motion detection device further comprises an amplifying device to amplify the output of the motion detector, wherein the computation device determines the central value based on an output of the amplifying device.

In accordance with the embodiments of the present invention, the motion detector may comprise an acceleration detection device to detect acceleration, or a velocity sensor to detect velocity.

Further, in accordance with embodiments of the present invention, the reference value may be an output value of the motion detector when the motion detector is stationary. The central value may be an integrated mean value of the motion detection information after the motion detector begins detecting motion.

In accordance with embodiments of the present invention, the reference value may be $\omega\_0$ which is determined according to the equation $\omega\_0 = P \cdot S + (1-P) \cdot AV$, where AV is the central value, S is the default value, and P is a weight function. The weight function P may decrease as time progresses after the computation device begins a determination. Further, the weight function P is $0 \leq P \leq 1$.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
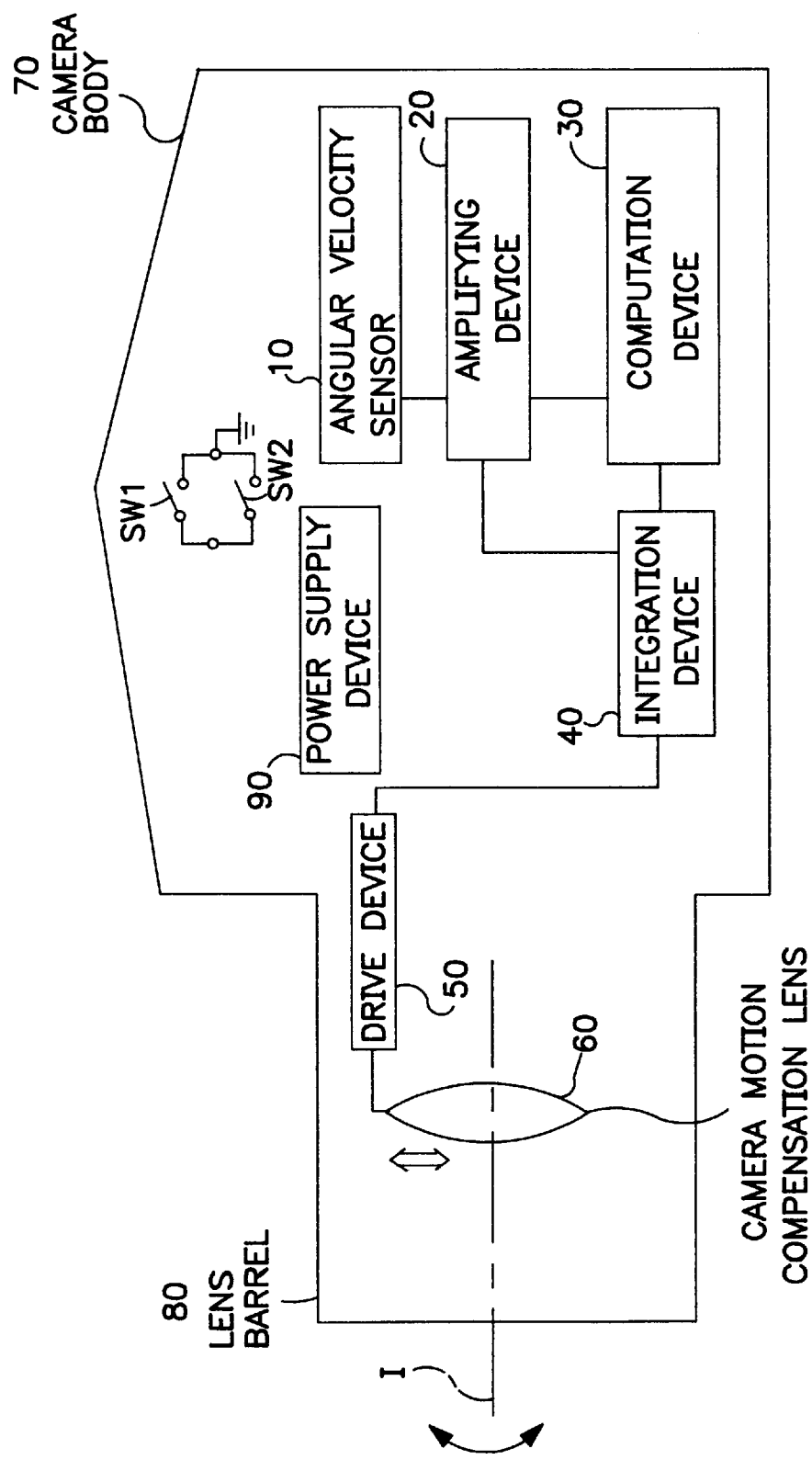
FIG. 1 is a cross sectional view of a single lens reflex camera including a motion detection device in accordance with embodiments of the present invention.

Reference will now be made in detail to the preferred embodiments of the present invention, examples of which are illustrated in the accompanying drawings, wherein like reference numerals refer to like elements throughout.

Embodiments of the motion detection device in accordance with the present invention will be described herein below as utilized in a single lens reflex camera. However, embodiment of the present invention are not limited to use in a single lens reflex camera, and can be used in other types of cameras or devices.

FIG. 1 is a cross-sectional view of a single lens reflex camera including a motion detection device in accordance with embodiments of the present invention. As shown in FIG. 1, the motion detection device includes an angular velocity sensor 10 to detect the motion of the camera, such as vibration or shake caused by hand tremor, and to output a voltage value proportionate to the colioli force affecting the camera. The angular velocity sensor 10 normally comprises two sensors to detect the angular velocity in the direction of two axes, that is, an X-axis direction and a Y-axis direction. More particularly, the angular velocity sensor includes a pitching angular velocity sensor to detect the angular velocity around the X-axis (i.e., a pitch direction) and a yawing angular velocity sensor to detect the angular velocity around the Y-axis (i.e., a yaw direction), in order to detect the angular velocities in the directions of the two axes.

The angular velocity sensor 10 outputs information representing detected motion to an amplifying device 20. The amplifying device 20 amplifies the output value of the angular velocity sensor 10. More particularly, the amplifying device 20 amplifies the motion detection information output from the angular velocity sensor 10, and provides the amplified output value to both a computation device 30 and an integration device 40. The integration device 40 converts the angular velocity signals to angular displacement signals by performing an integration computation, as will be described in detail hereinafter. The computation device 30 computes an omega zero from the output value of the amplifying device 20, as will now be described in detail below.

Figure 2:
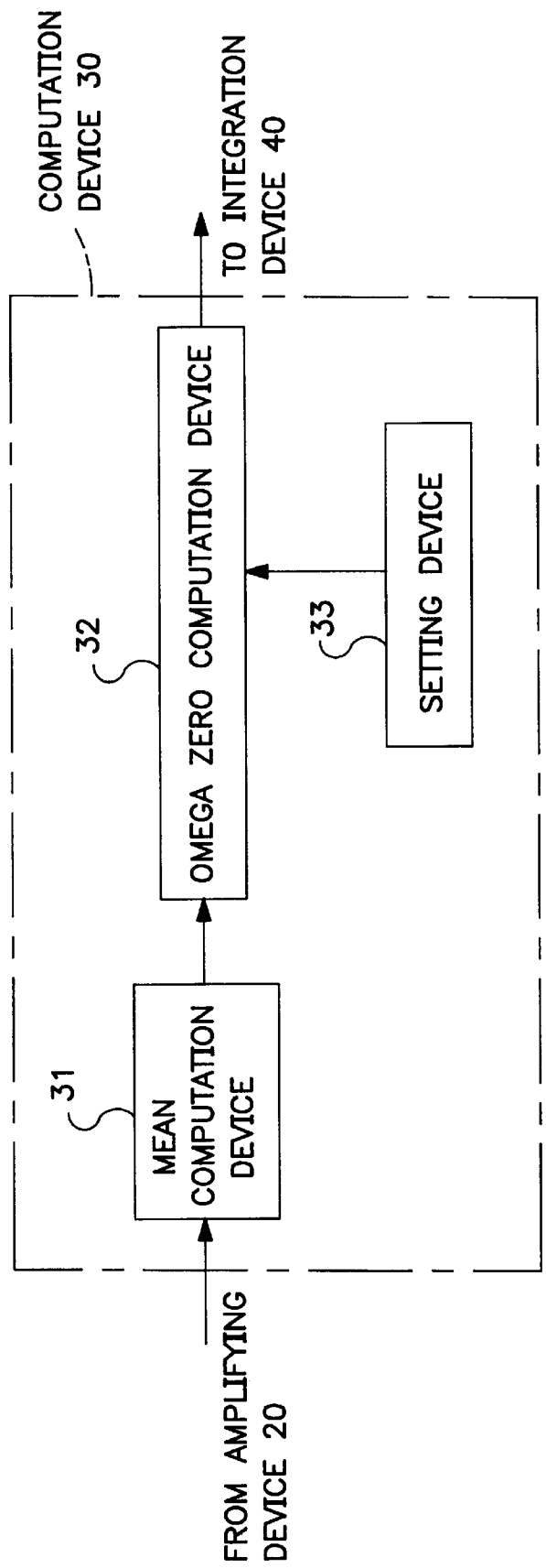
FIG. 2 is a block diagram of a computation device of the motion detection device in accordance with embodiments of the present invention.

FIG. 2 is a block diagram of the computation device 30 of the motion detection device in accordance with embodiments of the present invention. The computation device 30 includes a mean computation device 31 which receives the signals output by the amplifying device 20, a setting device 33, and an omega zero computation device 32 which receives the signals output from the mean computation device 31 and the setting device 33. The omega zero computation device 32 outputs the computed omega zero to the integration device 40, as will be described in detail hereinafter.

The mean computation device 31 calculates an integration mean value from the signals received from the amplifying device 20 using the following equation.

$$AV\_\omega(t) = \Sigma\omega(i)/t \qquad \text{[Equation 1]}$$

Equation 1 is used to obtain an integration mean value for the signal input to the mean computation device 31; however, as will be evident from the description below, the integration mean value calculated by the mean computation device 31 may be used as the omega zero when a sufficient time has passed after the computation has begun.

The setting device 33 sets an omega zero initial estimate value, referred to as "Magic". The omega zero initial estimate value Magic may be a constant value which is written in advance in a memory, such as an EEPROM, to permanently store the omega zero initial estimate value Magic. A method to determine the omega zero initial estimate value Magic includes monitoring the output of the angular velocity sensor 10 when the angular velocity sensor 10 is static, such as when shipping the motion detection device from the factory, and storing the output value of the angular velocity sensor 10 when it is static.

The omega zero computation device 32 computes omega zero based on the integration mean value computed in the mean computation device 31 and the omega zero initial estimate value Magic set in the setting device 33, as will be described in detail hereinafter. The omega zero computation device 32 calculates the omega zero according to the following equation.

$$W\_\omega(t) = p(\tau;t)\cdot\text{Magic} + (1-p(\tau;t))\cdot AV\_\omega(t) \qquad \text{[Equation 2]}$$

Equation 2 computes a weight average (hereinafter referred to as an "interpolation average") for the integration mean value and the omega zero initial estimate value Magic, based on the integration mean value calculated according to Equation 1 in the mean computation device 31 and the omega zero initial estimate value Magic set in advance in the setting device 33.

In Equation 2, the function $p(\tau;t)$ is a weight function for determining an employment ratio between the integration mean value $AV\_\omega(t)$ and the omega zero initial estimate value Magic. $\tau$ is a parameter representing the period of time during which the omega zero initial estimate value Magic is relied on. The parameter $\tau$ may be a constant value written in advance in a memory, such as an EEPROM, to permanently store the parameter $\tau$.

The weight function $p(\tau;t)$ may be expressed, for example, by the following equation.

$$p(\tau;t) = \exp(-t/\tau) \qquad \text{[Equation 3]}$$

The weight function $p(\tau;t)$ is a reducing function that decreases as time progresses after computation has begun. According to the weight function $p(\tau;t)$, during the initial stage after computation has begun, that is, when $\tau$ is small, omega zero is computed with the greater weight given the omega zero initial estimate value Magic. As time progresses after the computation has begun, that is, as $\tau$ becomes greater, omega zero is computed with greater weight given the integration mean value.

As shown in FIG. 1, the integration device 40 subtracts the output value of the computation device 30 from the output value of the amplifying device 20 to perform the integration computation. More particularly, the integration device 40 converts the angular velocity signals to angular displacement signals by performing the integration computation.

The drive device 50, shown in FIG. 1, outputs drive signals to drive the motion compensation lens 60 (which will be described in detail hereinafter) based on the angular displacement signals from the integration device 40. The drive device 50 includes a servo circuit for control, an actuator to drive the motion compensation lens 60, and a position detection device to detect the driving position of the motion compensation lens 60.

The motion compensation lens 60 is driven in a direction that is perpendicular or almost perpendicular to the optical axis I (in the direction of the arrow in the FIG. 1) to compensate for the camera motion. The motion compensation lens 60 is preferably a part of the image forming optical system of the camera and compensates for camera motion, such as motion caused by hand shake, by changing the optical axis I of the image forming optical system of the photographic device according to the drive signal from drive device 50 such that the optical axis is made off-center.

A lens barrel 80 accommodates the photographic optical system that includes the motion compensation lens 60. The lens barrel 80 can be freely attached to and removed from the camera body 70 and is interchangeable.

A power supply device 90 supplies electrical power to the angular velocity sensor 10, and other camera components. The power supply device 90 supplies electrical power to the angular velocity sensor 10 in response to switching on a half-push switch SW1. The half-push switch SW1 is switched on in conjunction with the half-push action of a release button (not shown), and initiates a series of photographic preparation operations when switched on. A full-push switch SW2 initiates a photographic operation of the camera, such as an exposure operation. The full-push switch SW2 is switched on in conjunction with the full push action of the release button.

Figure 3:
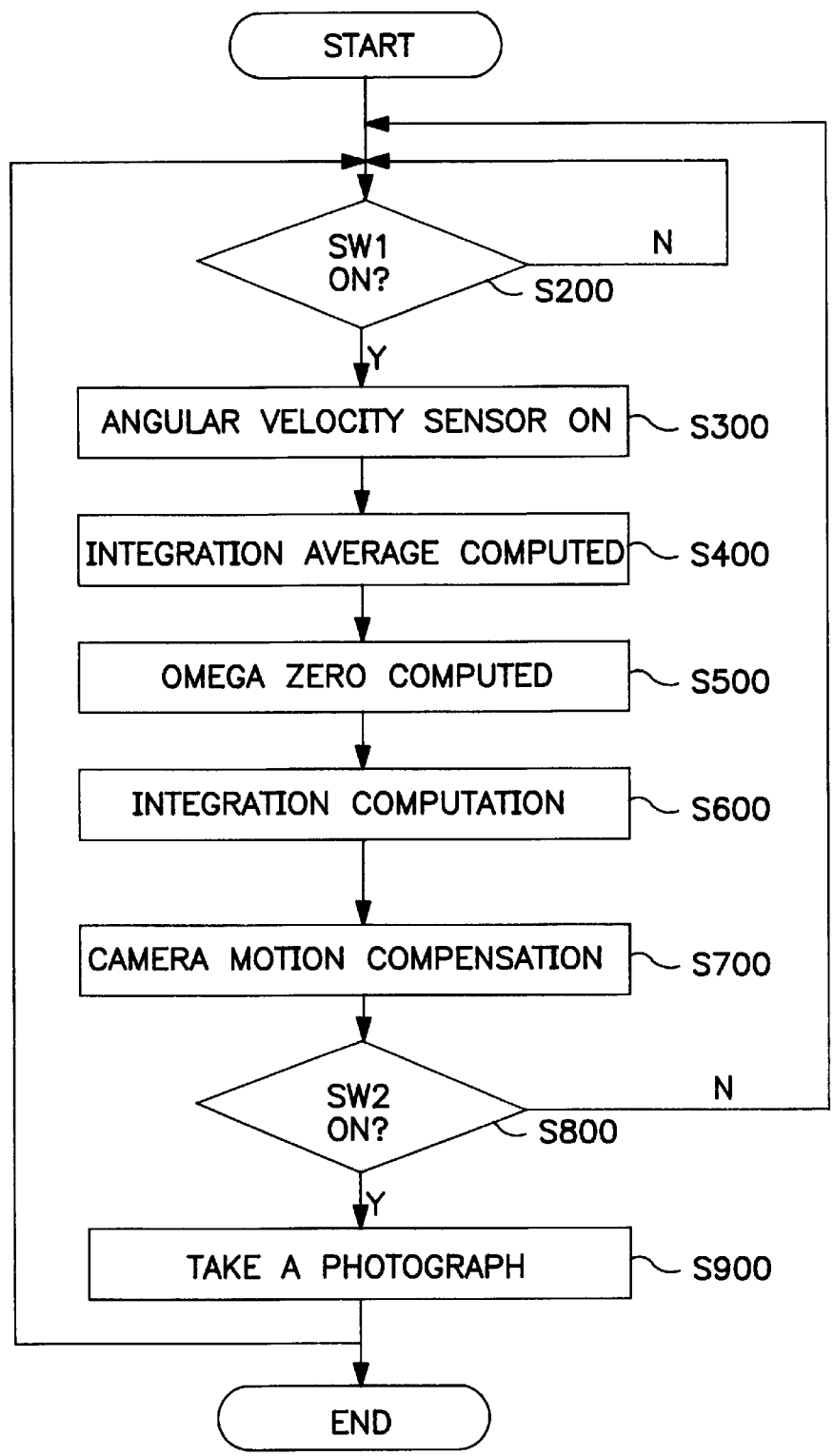
FIG. 3 is a flowchart illustrating an operational process for performing motion detection and motion compensation with a single lens reflex camera having a motion detection device in accordance with embodiments of the present invention.

An explanation of the operation of the motion detection device in accordance with embodiments of the present invention will now be provided with reference to FIG. 3 which is a flowchart illustrating an operational process for performing motion detection and motion compensation in a single lens reflex camera having a motion detection device in accordance with embodiments of the present invention.

Beginning in step S200, it is determined whether or not the half-push switch SW1 is on. If the half-push switch SW1 is on, the operational process proceeds to step S300. If the half-push switch SW1 is not on, the determination process of step S200 is repeatedly executed until the half-push switch S1 is switched on.

Next, in step S300, electrical power is supplied to the angular velocity sensor 10 from the power supply device 90. The power supply device 90 detects the on action of the half-push switch SW1 as the release button is pressed down, and supplies electrical power to the angular velocity sensor 10. During and after the second loop of the flowchart of FIG. 3, power supply to angular velocity sensor 10 is continued.

Continuing, in step S400, the mean computation device 31 computes the integration mean value according to Equation 1. The mean computation device 31 computes the integration mean value according to the motion detection information output from the angular velocity sensor 10. During the first loop of the flowchart of FIG. 3, the mean computation device 31 begins integration based on the motion detection information output from the angular velocity sensor 10.

In step S500, the omega zero computation device 32 computes the omega zero value according to Equation 2. The omega zero computation device 32 computes the omega zero based on the integration mean value which has been computed by the mean computation device 31 and the omega zero initial estimate value Magic set by the setting device 33. Integration begins during the first loop of the flowchart of FIG. 3.

Proceeding to step S600, the integration device 40 performs the integration computation. More particularly, the integration device 40 subtracts the output value of computation device 30 from the output value of amplifying device 20 and converts the angular velocity signals into angular displacement signals by the integration computation. The integration computation begins during the first loop of the flowchart of FIG. 3.

Next, in step S700, the motion compensation lens 60 begins the motion compensation process. During the motion compensation process, the drive device 50 outputs a drive signal based on the angular displacement signal from the integration device 40. The motion compensation lens 60 is driven according to the drive signal form the drive device 50 to a position which shifts the optical axis of the image forming optical system to an off-centered position to compensate for camera motion. The motion compensation process begins during the first loop of the flowchart of FIG. 3.

In step S800, it is determined as to whether or not full push switch SW2 is switched on. If the full-push switch SW2 is switched on, the operational process proceeds to step S900, at which time a photograph is taken. However, if the full-push switch SW2 is not switched on, the operational process returns to step S200 to determine whether or not the half push-switch SW1 is switched on.

In step S900, a photograph is taken, which includes a series of photographic operations, such as opening and closing of the shutter by a shutter mechanism, as well as the winding of the film by a film winding mechanism. When the photographic operation is completed, the operational process returns to step S200 to determine whether or not half-push switch SW1 is on, or to end the operational process.

Next, a comparison will be described of a result of computation of omega zero using the interpolation average method with a motion detection device in accordance with embodiments of the present invention, and a result of computation of omega zero using the movement average method with a conventional camera shake detection device.

Figure 4:
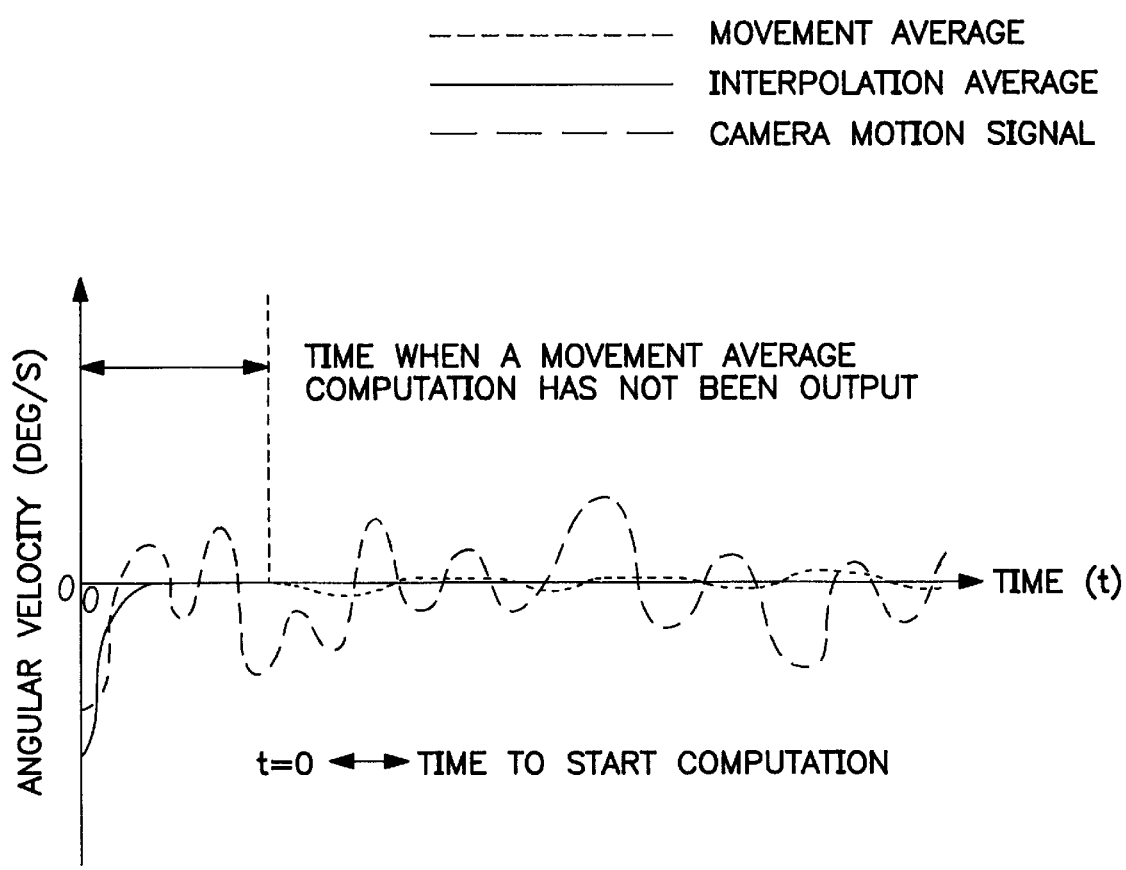
FIG. 4 is a graph illustrating a comparison between a result of an omega zero determined with a motion detection device using an interpolation average method in accordance with the present invention and an omega zero computed using a movement average method with a conventional motion detection device.
Figure 5:
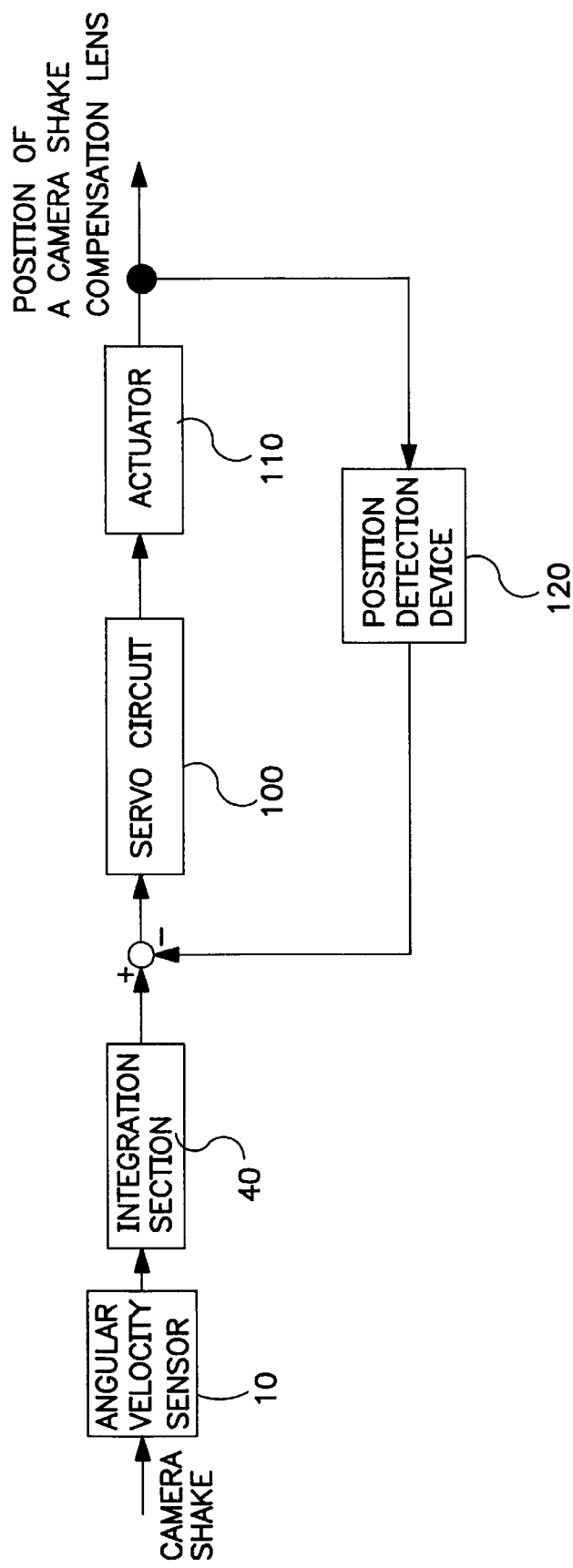
FIG. 5 is a block diagram of a conventional camera shake compensation device.
Figure 6A:
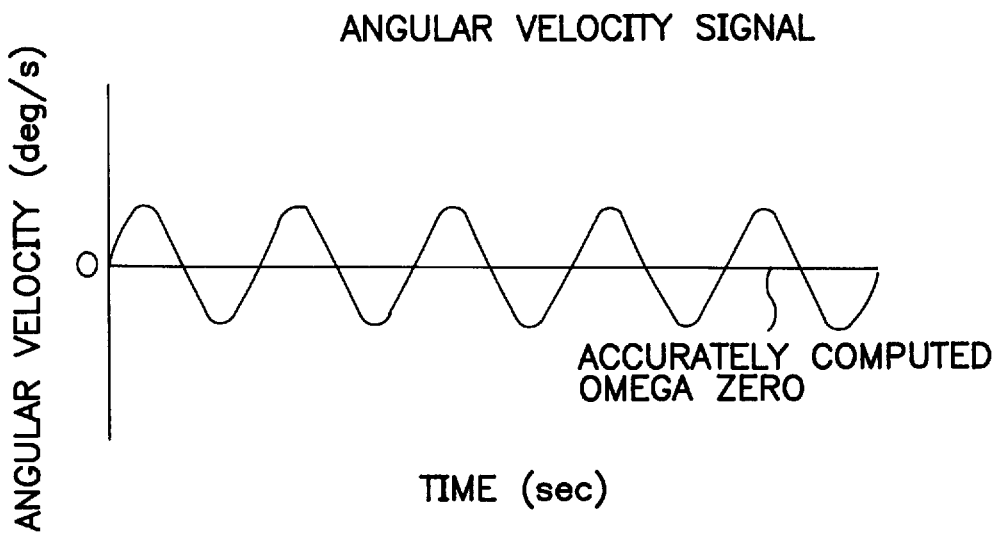
FIG. 6A and FIG. 6B are diagrams showing an example of successful computation of omega zero with a conventional camera shake compensation device.
Figure 6B:
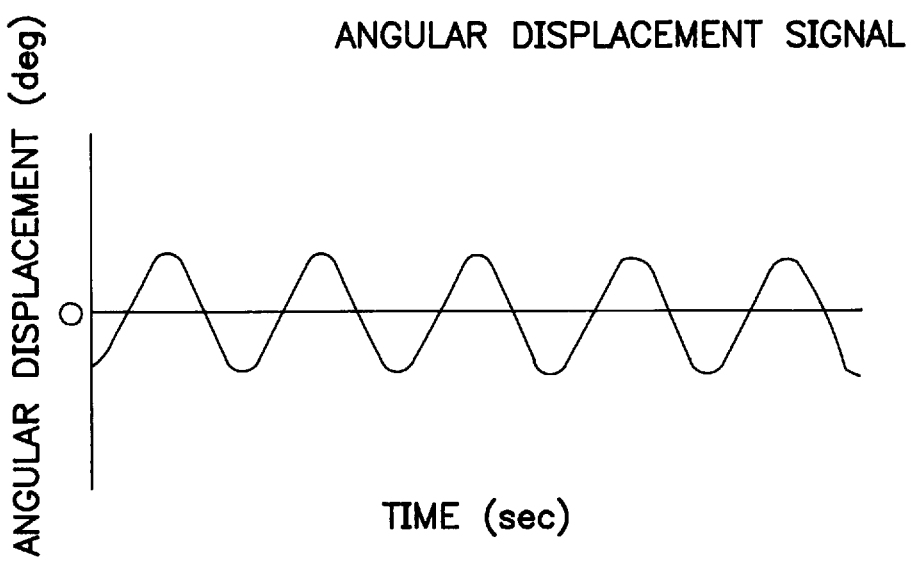
Figure 7A:
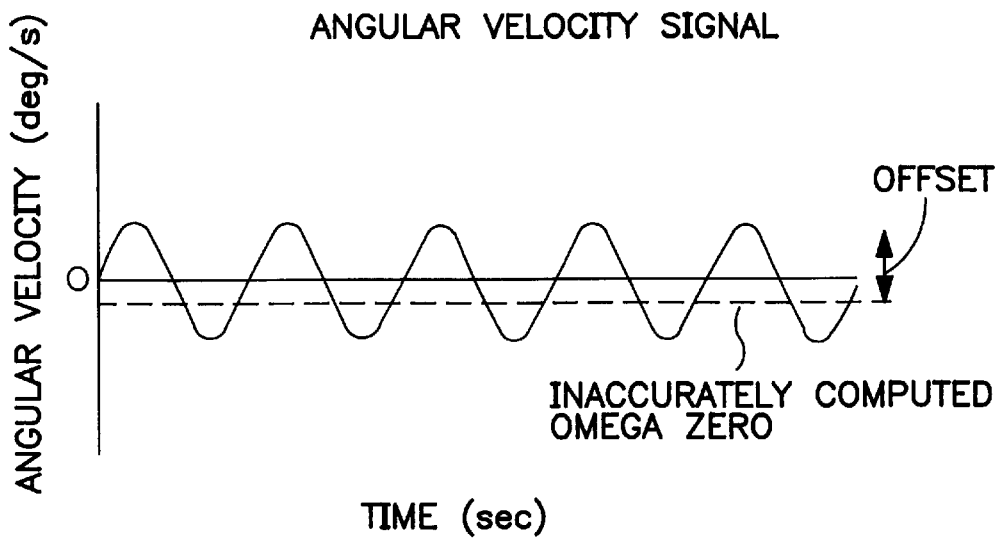
FIG. 7A and FIG. 7B are diagrams showing an example of failure in computation of omega zero with a conventional camera shake compensation device.
Figure 7B:
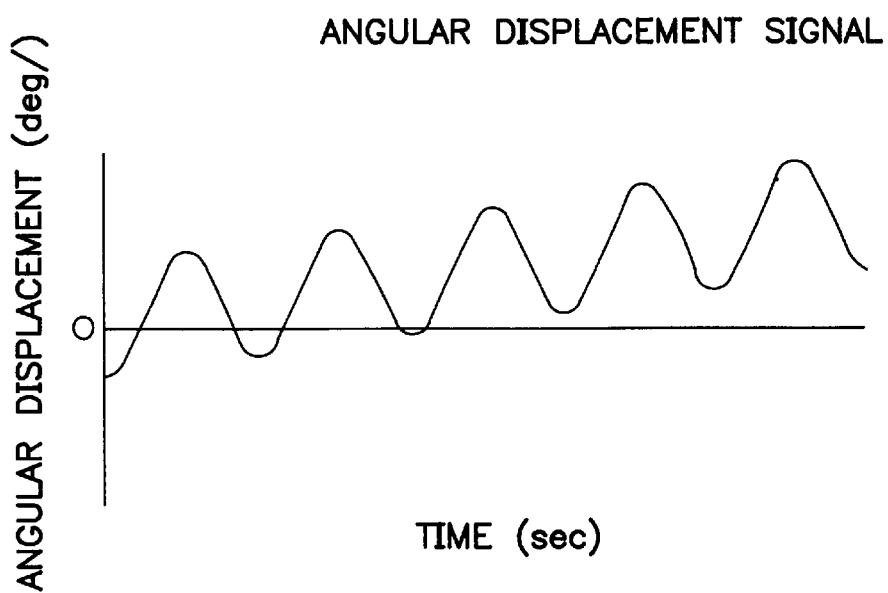

FIG. 4 is a graph showing a comparison between an omega zero determined with a motion detection device using the interpolation average method in accordance with embodiments of the present invention, and an omega zero computed using the movement average method with a conventional camera shake detection device.

As shown in FIG. 4, with a conventional camera shake detection device employing a movement average computation method, a time during which the movement average computation is not output (a non-output time) exists for a long while after starting the computation. On the other hand, with a motion detection device employing the interpolation average computation method in accordance with embodiments of the present invention, the computation results are obtained immediately after the beginning of computation and omega zero converges on zero at an early stage after the interpolation average computation has begun.

Moreover, with the conventional motion detection device employing a movement average computation method, computation results oscillate, even after a sufficient time has passed after beginning the computation, thus causing computation errors. In particular, as shown in FIG. 4, with the conventional motion compensation device using the movement average computation method, after a specified time has passed the computation results oscillate greatly if there is a large camera shake signal. On the other hand, with a motion detection device using the interpolation average computation method in accordance with the present invention, computation results do not oscillate when a sufficient time has passed after beginning the computation, thereby achieving a computation of omega zero with high accuracy.

In accordance with embodiments of the present invention, since the motion detection device computes omega zero using an interpolation mean value, omega zero can be computed with a high degree of accuracy at an early stage after the computation begins, thereby enabling the detection of camera motion with a high degree of accuracy at an early stage after the computation begins. As a result, it is possible to substantially reduce the time lag from the beginning of computation of omega zero through the beginning of the motion compensation operation, which has been difficult with a conventional camera shake detection device. Thus, in accordance with embodiments of the present invention, a failure, such as missing a shutter opportunity, is prevented.

Furthermore, in accordance with embodiments of the present invention, the motion detection device can determine omega zero with a high degree of accuracy using the interpolation average computation method since the computation results do not fluctuate, even when a sufficient time has passed after the computation begins. As a result, the motion detection device employing the interpolation average method can improve the precision of the motion compensation in comparison with a camera motion compensation method employing a conventional computation method using a movement average.

In accordance with a second embodiment of the present invention, Equation 3 described with respect to the previous embodiment may be replaced, for example, with a function which places a greater weight on the omega zero initial estimate value Magic when t is small, and which places a greater weight on the integration mean value computed according to Equation 1 as t becomes greater. For example, the following equations may replace Equation 3 in the previous embodiment.

$$P(\tau;t)=-t/\tau+1(t\leq\tau)P(\tau;t)=0(t>\tau)$$  [Equation 4]

In Equation 4, the weight ratio between the omega zero initial estimate value Magic and the integration mean value is 1:0 when t=0; the weight ratio is 0:1 when t=τ/2.

The present invention is not limited to the above-described embodiments, and many variations and modifications are possible within the scope of the present invention. For example, in accordance with the embodiments of the invention described above, the integration device 40 of the motion detection device is a separate device. However, the integration device may be integrated in the computation device 30.

Further, the omega zero initial estimate value Magic may be varied according to mechanical characteristics of the camera, characteristics of the angular velocity sensor, photographic conditions, or the input value of the angular velocity signals. Furthermore, a plurality of values for the omega zero initial estimate value may be stored in advance, and the omega zero initial estimate value may be set by selecting one of the plurality of values according to the photographic situation. Still further, past data of the omega zero initial estimate value Magic may be learned and an optimum data value to be set may be selected.

In accordance with embodiments of the present invention described above, the mean computation device 31 computes the integration mean value of the angular velocity signal using Equation 1; however, the present invention is not limited to determining the integration mean value using only Equation 1. For example, other mean value computation methods can be used, such as the statistical method of least squares. Furthermore, the present invention is not limited to using a mean computation method. For example, a computation method in which low frequency elements of the waveform of the angular velocity are extracted by digital filters, or the like, can be used.

Moreover, the parameter τ in Equation 2 may be varied according to the photographic conditions at the time.

Embodiments of the present invention have been described as using an angular velocity sensor to detect camera motion. However, the present invention is not limited to an angular velocity sensor to detect camera motion, and other types of motion sensors may be used in the motion detection device, such as an acceleration sensor or other types of sensors. For example, if an angular velocity sensor is used to detect motion, an interpolation mean value is first computed for the angular velocity signal, and then the result of the interpolation mean value computation is integrated to convert the result to an angular velocity signal. Subsequently, the angular velocity signal is computed using an interpolation computation method as described in accordance with embodiments of the present invention, and the computation result is further integrated to convert it into an angular displacement signal.

Moreover, in accordance with the embodiments of the present invention, the motion detection device has been described as a component of a motion compensation device provided in a still camera. However, the present invention is not limited to employment in a still camera, and the present invention may also be employed in any device in which it is desirable to suppress image blur of an image formed by an optical system, such as a video camera, binoculars, camcorders, motion picture cameras, range finding equipment, lasers, fiber optic communication systems, optical projection systems, CD mastering systems, or a telescope. Furthermore, the present invention may be applied to a compact camera in which a lens barrel is not interchangeable.

Moreover, in accordance with embodiments of the invention described above, the angular velocity sensor is turned on in response to the half-push switch SW1 being switched on (step S300). However, the timing to turn on the angular velocity sensor 10 may be synchronized with, for example, an action of turning on the main power switch of a camera.

In accordance with the embodiments of the present invention described in detail above, a computation device computes a reference value from a central value computed according to motion detection information and a default value set by a setting device. The computation device computes the central value based on the output value of an amplifying device, thereby attaining an accurate reference value immediately after the computation process begins.

In accordance with embodiments of the present invention, the motion detector may be an acceleration sensor to detect acceleration, and the reference value is determined based on the output signal of the acceleration sensor. Alternatively, the motion detector may be a velocity detector to detect velocity, and the reference value is determined based on the output signal of the velocity detector.

The reference value is preferably an output value when the motion detector is static. Accordingly, the reference value for control of camera motion compensation may be easily obtained.

The central value is preferably an integration average value after the motion detector begins detection of motion. Accordingly, the reference value may be attained with a high degree of accuracy using the integration average value after the detection of the vibration begins.

The reference may be defined by $\omega\_0 = P \cdot S + (1-P) \cdot AV$, where AV is the central value, S is the default value, and P is a weight function where $0 \leq P \leq 1$. Accordingly, the reference value can be precisely computed by appropriately weighting the central and reference values.

The weight function P may be a reducing function that decreases as time progresses after the computation device begins the computation function. Accordingly, the reference value may be computed by giving greater weight to the default value at an early state after the computation function begins and then placing greater weight on the central value as time progresses after the beginning of the computation function.

Although a few preferred embodiments of the invention have been shown and described, it will be appreciated by those skilled in the art that changes may be made in these embodiments, without departing from the principles and the spirit of the invention, the scope of which is defined in the appended claims and their equivalents.

What is claimed is:

1. A motion detection device, suitable for use in a camera, comprising:
   a motion detector to detect motion and to output motion detection information;
   a computation device to determine a reference value used in determining an amount of detected motion;
   a central value determining device to determine a central value of the motion detection information; and
   a setting device to set an initial estimate value of the reference value,
   wherein the computation device determines the reference value based on the central value and the initial estimate value.

2. A motion detection device as recited in claim 1, further comprising:
   an amplifying device to amplify the output of the motion detector,
   wherein the control value determining device determines the central value based on an output of the amplifying device.

3. A motion detection device as recited in claim 1, wherein the motion detector comprises an acceleration detection device to detect acceleration.

4. A motion detection device as recited in claim 1, wherein the motion detector comprises velocity sensor to detect velocity.

5. A motion detection as recited in claim 1, wherein the initial estimate value is an output value of the motion detector when the motion detector is stationary.

6. A motion detection device as recited in claim 1, wherein the central value is an integrated mean value of the motion detection information after the motion detector begins detecting motion.

7. A motion detection device as recited in claim 1, wherein the reference value is $\omega\_0$ and is determined according to the equation $\omega\_0 = P \cdot S + (1-P) \cdot AV$, where AV is the central value, S is the initial estimate value, and P is a weight function.

8. A motion detection device as recited in claim 7, wherein the weight function P decreases as the time progresses after the computation device begins a determination.

9. A motion detection device as recited in claim 8, wherein the weight function P is $0 \leq P \leq 1$.

10. A method of performing motion detection for a motion compensation operation, comprising the steps of:
    detecting motion using a motion detector and outputting information representing the detected motion; and
    determining a reference value used in determining an amount of detected motion, wherein the step of determining a reference value includes
      determining a central value of the information representing detected motion;
      setting an initial estimate value of the reference value; and
      determining the reference value based on the central value and the initial estimate value.

11. A method as recited in claim 10, wherein
    the step of determining a central value comprises determining an average of the information representing detected motion, and
    the step of determining an initial estimate value comprises detecting the output of the motion detector when the motion detector is static.

12. A method as recited in claim 11, wherein the step of determining a reference value comprises computing a weighted average of the central value and the initial estimate value.

13. A motion compensation device, comprising:
    a motion sensor to detect motion and to output motion detection information;
    a computation device to perform time integration of the output of the motion sensor to produce a displacement signal, wherein the computation device determines an integration constant used to perform the time integration of the output of the motion sensor based on a mean value of the motion detection information and an initial estimate value of the integration constant.

14. A motion compensation device as recited in claim 13, wherein the computation device comprises:
    a mean computation device to determine a mean value of the motion detection information; and
    a setting device to set the initial estimate value of the integration constant.

15. A motion device as recited in claim 14, wherein the setting device determines the initial estimate value based on an output of the motion sensor when the motion sensor is stationary.

16. A motion compensation device as recited in claim 13, wherein the computation device determines the integration constant by assigning respective weights which change over time to the initial estimate value and to the mean value, wherein the initial estimate value is initially given a greater weight, and the mean value is given a greater weight as time progresses.

17. A motion compensation device as recited in claim 13, further comprising:
    a drive device; and
    a motion compensation lens driven by the drive device, wherein the drive device receives the displacement signal from the computation device, and drives the motion compensation lens according to the displacement signal.

18. A motion compensation device as recited in claim 13, wherein the computation device includes an integration device to subtract the integration constant from the motion detection information, and to integrate a result of the subtraction of the integration constant from the motion detection information to output the displacement signal.

19. A motion compensation device as recited in claim 13, wherein the motion sensor is either an angular velocity sensor or an acceleration sensor.

20. A motion compensation device, comprising:

means for detecting motion and outputting motion detection information;

means for determining a central value of the motion detection information;

means for setting an initial estimate value of a reference value for motion compensation control; and means for determining the reference value for motion compensation control based on the central value and the initial estimate value.

* * * * *